United States Patent
Huang

(10) Patent No.: US 7,259,765 B2
(45) Date of Patent: Aug. 21, 2007

(54) HEAD/DATA SCHEDULING IN 3D GRAPHICS

(75) Inventor: Hsilin Huang, Milpitas, CA (US)

(73) Assignee: S3 Graphics Co., Ltd., Cayman Islands, Grand Cayman (VG)

( * ) Notice: Subject to any disclaimer, the term of this patent is extended or adjusted under 35 U.S.C. 154(b) by 417 days.

(21) Appl. No.: 10/407,446

(22) Filed: Apr. 4, 2003

(65) Prior Publication Data

US 2004/0201592 A1    Oct. 14, 2004

(51) Int. Cl.
*G09G 5/36* (2006.01)
*G06F 13/00* (2006.01)

(52) U.S. Cl. .................. 345/556; 345/558; 345/536; 345/422; 711/128; 711/133

(58) Field of Classification Search ............ 345/520, 345/420, 419, 422, 522, 557, 611, 582, 536, 345/556; 716/10; 708/508; 717/51; 711/128, 711/133
See application file for complete search history.

(56) References Cited

U.S. PATENT DOCUMENTS 4,747,154 A    5/1988 Suzuki et al. .............. 382/47
5,821,940 A *  10/1998 Morgan et al. ............. 345/420
6,597,363 B1    7/2003 Dulak et al. ................ 345/506
6,906,716 B2    6/2005 Moreton et al. ............ 345/423

FOREIGN PATENT DOCUMENTS

EP    0803798 A1    3/1997

* cited by examiner

*Primary Examiner*—Kee M. Tung
*Assistant Examiner*—Motilewa Good-Johnson
(74) *Attorney, Agent, or Firm*—Thomas, Kayden, Horstemeyer & Risley

(57) ABSTRACT

A system for processing graphics data for a stream of graphics primitives, such as triangles. The system has a plurality of memories each for storing an index of the primitive. A controller selects a memory to store the index and assigns a thread id to the index, the thread id indicating in which memory the index is stored. The thread id is stored in both a HEAD ID FIFO and a DATA ID FIFO, to maintain the order of the primitives during processing. A first multiplexer accesses a selected memory based on a thread id provided by the HEAD ID FIFO and a second multiplexer accesses a selected memory based on a thread id provided by the DATA ID FIFO. For each of the vertices of the graphics primitive, the first multiplexer provides a pointer for accessing coordinate information and the second multiplexer provides a pointer for accessing attribute information.

13 Claims, 5 Drawing Sheets

DATA STRUCTURE FOR FIG 1

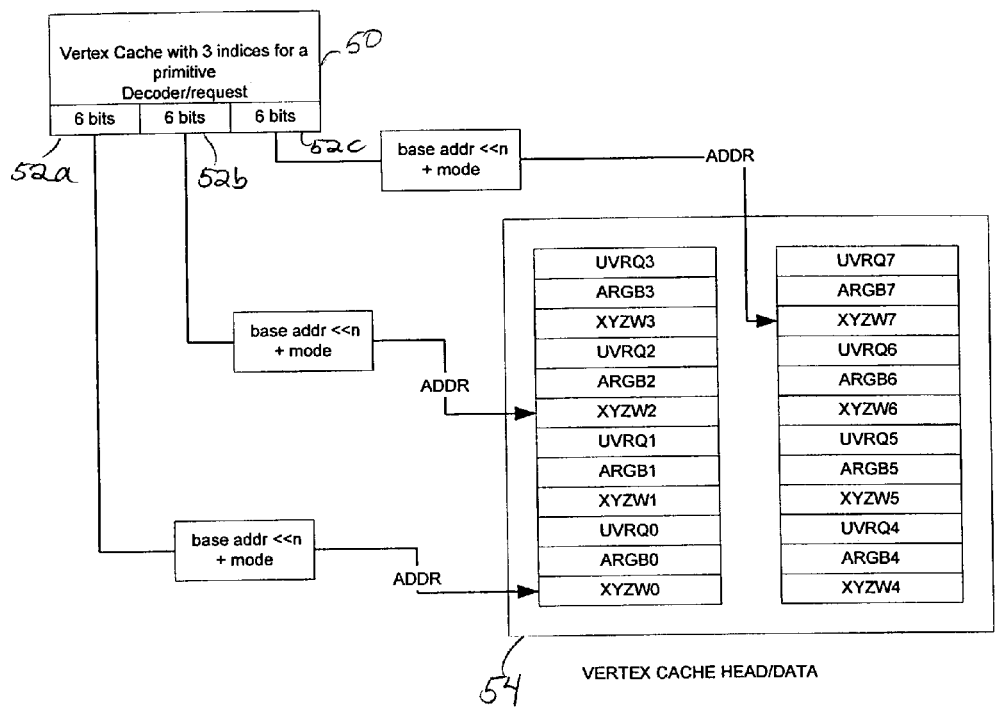

VERTEX CACHE HEAD/DATA

An example
ONE TRIANGLE DATA in single thread

Cycle 1. Fetch XYZW of vertex0, Fetch XYZW of vertex1, Fetch XYZW of vertex2
Cycle 2. Fetch ARBG of vertex0, Fetch ARGB of vertex1, Fetch ARGB of vertex2
Cycle 3. Fetch UVRQ of vertex0, Fetch UVRQ of vertex1, Fetch UVRQ of vertex2

An example
TWO TRIANGLES DATA in two threads

Cycle 1. Fetch XYZW of vertex0, Fetch XYZW of vertex1, Fetch XYZW of vertex2 for thread 0
Cycle 2. Fetch XYZW of vertex0, Fetch XYZW of vertex1, Fetch XYZW of vertex2 for thread 1
Cycle 3. Fetch ARBG of vertex0, Fetch ARGB of vertex1, Fetch ARGB of vertex2 for thread 0
Cycle 4. Fetch UVRQ of vertex0, Fetch UVRQ of vertex1, Fetch UVRQ of vertex2 for thread 0
Cycle 5. Fetch ARBG of vertex0, Fetch ARGB of vertex1, Fetch ARGB of vertex2 for thread 1
Cycle 6. Fetch UVRQ of vertex0, Fetch UVRQ of vertex1, Fetch UVRQ of vertex2 for thread 1

FIG. 1B

HEAD/DATA SCHEDULING IN 3D GRAPHICS

CROSS-REFERENCE TO RELATED APPLICATIONS

The application is related to U.S. Application entitled "HEAD-DATA REQUEST IN 3D GRAPHICS," filed Apr. 4, 2003, Ser. No. 10/407,448, (now U.S. Pat. No. 7,148,888), which application is incorporated by reference into the present application.

FIELD OF THE INVENTION

The present invention generally relates to data scheduling for graphic engines and more particularly to data retrieval when the data is out of order.

DESCRIPTION OF THE RELATED ART

For 3D graphic applications, each vertex has coordinates (X, Y, Z, W), color attributes (specular, ARGB, Diffuse ARGB and fog), and texture parameters (U, V). Referring to Table 1, typical data for triangles is shown. Specifically, triangle 0 has vertex coordinates HT0 and vertex attributes DT0_d (diffuse color), DT0_s (specular color), DT0_f (fog color), DT0_t (texture Triangles 1 and 2 have the same parameters, that is HT1, DT1_d, DT1_S, DT1_f and DT1_t, for triangle 1 and HT2, DT2_d, DT2_s, DT2_f, DT2_t for triangle 2. As seen in Table 1, it takes thirty (30) cycles to process data in the pipeline for six triangles.

TABLE 1

| | Cycle | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Data | HT0 | DT0_d | DT0_s | DT0_f | DT0_t | HT1 | DT1_d | DT1_s | DT1_f | DT1_t | HT2 | DT2_d | DT2_s | DT2_f | DT2_t |
| | Cycle | | | | | | | | | | | | | | |
| | 16 | 17 | 18 | 19 | 20 | 21 | 22 | 23 | 24 | 25 | 26 | 27 | 28 | 29 | 30 |
| | HT3 | DT3_d | DT3_s | DT3_f | DT3_t | HT4 | DT4_d | DT4_s | DT4_f | DT4_t | HT5 | DT5_d | DT5_s | DT5_f | DT5_t |

Also evident from Table 1, when multiple triangles are rendered by a graphics processor, not only the homogeneous coordinates (X, Y, Z, W) but also the vertex attributes must be fetched. As the use of more textures and other parameters increases, increasing numbers of vertex attributes must be fetched. However, statistically, only about half of the triangles are ever rendered on the screen. The other half of the triangles are rejected as being outside of the scissors box or culled.

When the graphics primitives are rejected or culled, new graphics primitives can be accepted into the processing system as new processing threads. The new primitives may be loaded into storage associated with a thread without regard to the original order of the primitive in the graphics primitive stream to improve the speed of processing. However, the out of order acceptance of new primitives for processing creates at least a problem with the Z-buffer, which requires that the order of the vertices for the primitives be maintained. Therefore, there is a need to maintain the ordering of the new primitives as they arrive for processing, even though they are accepted into thread storage out of their original order.

BRIEF SUMMARY OF THE INVENTION

The present invention is directed towards the above-mentioned need. A system for processing graphics data in accordance with the present invention includes a plurality of memories, a plurality of decoders, a HEAD ID FIFO, a DATA ID FIFO, a controller, a DATA multiplexer, and a HEAD multiplexer. The plurality of memories, where each has a unique thread id as an identifier of the memory, is configured to store an index of each graphics primitive in the stream. Each decoder is coupled to one of the memories and each is configured to generate a pointer pointing to HEAD parameters of the primitive and one or more pointers pointing to DATA parameters of the primitive based on the graphics primitive index stored in the memory to which the decoder is coupled. The HEAD ID FIFO is configured to store thread ids each indicating which memory a corresponding index item is stored. The DATA ID FIFO is configured to store thread ids each indicating which memory a corresponding index item is stored. The controller receives the indexes ordered according to the stream of graphics primitives and is operative to select one of the plurality of memories for storing each received index and store the received index in the selected memory, assign a thread id to the received index, and store the assigned thread id in both the HEAD ID FIFO and the DATA ID FIFO. The HEAD multiplexer is coupled to the plurality of memories and has a selection input that receives a stored thread id from the HEAD ID FIFO to select one of the plurality of decoders to output a pointer pointing to HEAD parameters of the primitive and the DATA multiplexer is coupled to the plurality of memories and has a selection input that receives a thread id from the DATA ID FIFO to select one of the plurality of decoders to output a pointer pointing to DATA parameters of the primitive.

A method of processing a stream of graphics data for a stream of graphics primitives, in accordance with the present invention includes receiving an index for a graphics primitive in the graphics stream, where the graphics primitive has one or more vertices and each vertex has coordinate information and attribute information. An available one of a plurality of memories is selected to store the received index of the graphics primitive and a memory identifier is formed to indicate the memory selected for storing the received index. The received index is stored in the selected memory and the memory identifier for the index is stored in a HEAD ID FIFO and a DATA ID FIFO. One of the plurality of memories is selected to output a HEAD pointer for the graphics primitive when indicated by a memory identifier in the HEAD ID FIFO, where the HEAD pointer is formed based on the stored index and points to coordinate information for the vertices of the graphics primitive. Coordinate information is then accessed using the selected HEAD pointer. If a calculation determines that the graphics primitive is not rejected, then attribute information is accessed using a selected DATA pointer.

One advantage of the present invention is that processing throughput is improved because the memories holding graphics primitive index information can be reused as soon as possible. This occurs because as soon as primitive is known to be rejected, an available memory can be immediately freed to accept new index information.

Another advantage is that by processing the HEAD pointer with priority over the DATA pointer, whether or not the graphics primitive should be rejected is determined before DATA for the vertices is processed.

BRIEF DESCRIPTION OF THE DRAWINGS

These and other features, aspects and advantages of the present invention will become better understood with regard to the following description, appended claims, and accompanying drawings where:

FIG. 1B is a diagram of the data structures for FIG. 1A; and

DETAILED DESCRIPTION OF THE INVENTION

Figure 1A:
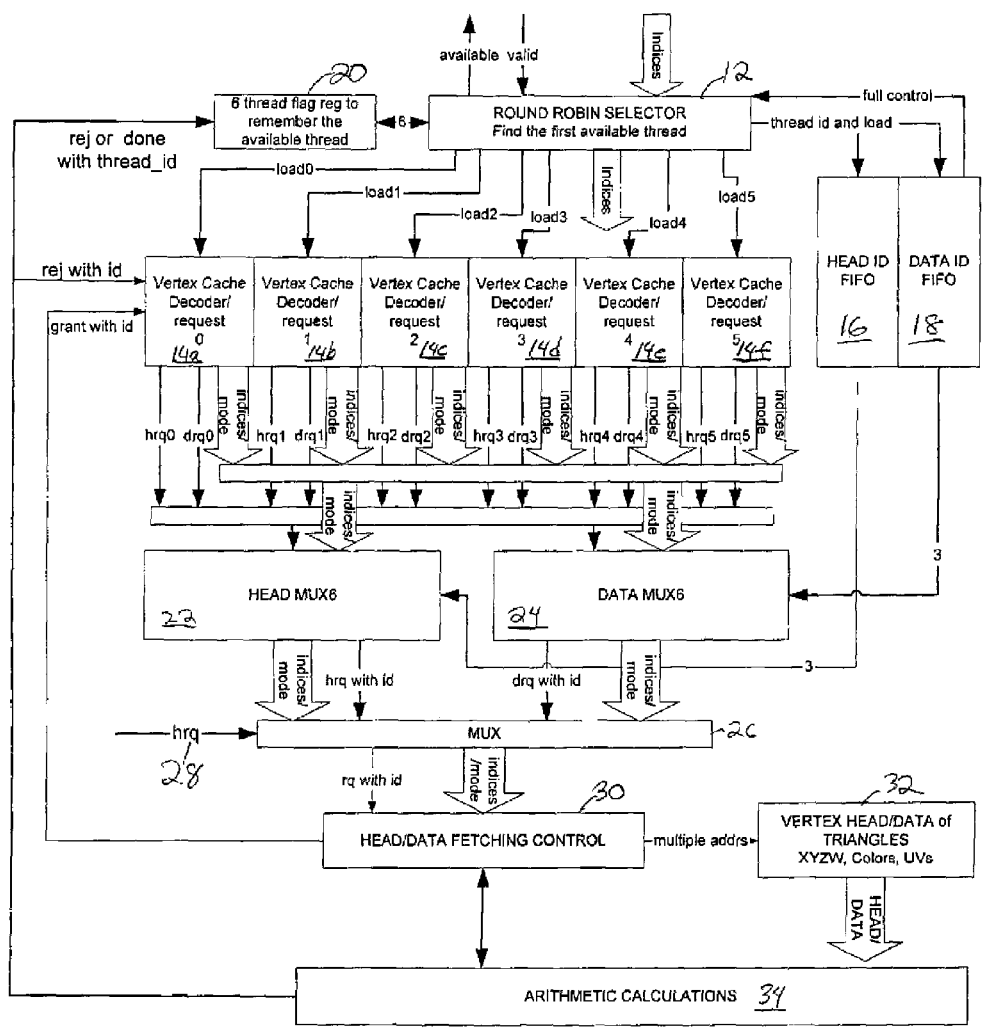
FIG. 1A is a block diagram illustrating a scheduling system constructed in accordance with the present invention.

Referring to the drawings wherein the showings are for purposes of illustrating a preferred embodiment of the present invention only, and not for purposes of limiting the same, FIG. 1 illustrates a system 10 for maintaining the stream order of HEAD/DATA index information.

The system 10 includes a round robin selector 12, a HEAD ID FIFO 16 and DATA ID FIFO 18, a plurality of vertex cache decoder/request units, 14a–14f, for holding graphics primitive indexes, a HEAD MUX 22, a DATA MUX 24, a final multiplexer 26, a HDEAD/DATA fetching control circuit 30, and a vertex cache 32 holding the graphics primitive data, which includes the coordinate information and attribute information for each vertex of the primitive, an arithmetic calculation block 34, and a thread flag register 20.

The round robin selector 12 receives a stream of index addresses which correspond to a stream of graphics primitives, such as a triangle or a line segment. The round robin selector 12 receives this index information, and a valid signal, indicating when the index information is present, and has a plurality of load control outputs, load0–load5, an output carrying the received index information, and an output carrying thread id information for the HEAD ID FIFO 16 and DATA ID FIFO 18.

The HEAD ID FIFO 16 and DATA ID FIFO 18 receive the thread id information and load information from the round robin selector 12 and provide selection inputs to the HEAD MUX 22 and the DATA MUX 24.

The vertex cache decoder/request units 14a–f accept and store the index information provided by the round robin selector 12. The index information is loaded into a vertex cache decoder/request unit when the load signal is activated by the round robin selector. The vertex cache decoder/request units also receive a grant with id signal from the HEAD/DATA fetching control circuitry 30, and a reject with id signal from the arithmetic calculation block 34. The grant with id acknowledges a request from a selected one of the vertex cache decoder/request units. The reject with id signal is used to abort the access of data from a particular vertex cache decoder/request unit, if and when the arithmetic calculation block 34 determines that the graphics primitive is rejected. The output of the vertex cache decoder/request includes a pointer derived from the index/mode, and a hrq and drq signal. The mode is a field defined as follows: mode==0 indicates HEAD; mode==1 indicates DATA 0; mode==2 indicates DATA 1; and mode==3 indicates DATA 2. The mode is combined with the index information to form a pointer applied to vertex cache 32 to access the stored data for a primitive.

The vertex cache decoder/request units operate on the index information to generate a head request and a data request and a pointer from the mode and index. In particular, the head request indicates that a pointer pointing to HEAD information is present because the mode is zero (indicating a zero offset from the index). A data request indicates that a pointer pointing to DATA information is present because the mode is greater than zero, i.e., the mode is 1, 2 or 3. The mode information modifies the index to form a pointer which is used to access vertex cache 32.

The HEAD MUX 22 receives the pointers and the head request signals hrq0-5 from the vertex cache decoder/request units. This multiplexer provides a selected pointer and a hrq signal with thread id to the final multiplexer 26, based on the value of the selection inputs, the value being a thread id received from the HEAD ID FIFO 16.

The DATA MUX 24 receives the pointers and data request signals drq0–5 from the vertex cache decoder/request units. This multiplexer provides a selected pointer and a drq signal with thread id to the final multiplexer 26, based on the value of the selection inputs, the value being a thread id received from the DATA ID FIFO 18.

The final multiplexer 26, selects either the HEAD pointer and hrq with id or the DATA pointer and drq with id to provide to the HEAD/DATA fetching control circuitry 30.

The HEAD/DATA fetching control circuitry 30 receives the selected pointer and a request with id from the final multiplexer 26, responds with a grant with id directed to the selected one of the vertex cache decoder/request units, and generates from the pointer the addresses for fetching the vertex data from the vertex cache 32.

Vertex cache 32 contains the actual graphics primitive data which includes the position coordinates (HEAD parameters), such as homogeneous coordinates (X, Y, Z, W) for each vertex of the primitive and the attributes (DATA parameters) such as color, texture and lighting attributes for each vertex of the primitive. Rendering calculations are performed on the coordinates of each vertex of the primitive to determine whether the primitive should be rejected as not within the visible space. If so, the arithmetic calculation block 34 returns a rejected signal with thread id to the thread flag register 20. The arithmetic calculation block 34 also determines whether a thread is no longer needed because the primitive has been rendered and provides an indicator to the thread flag register 20. Finally, the arithmetic calculation block 34 sends a grant with id signal to select one of the vertex cache decoder/request units for access.

The thread flag register 20 holds a set of binary flags, each of which indicates whether or not a thread is available. A thread is available if one of the vertex cache decoder/request units can accept a new graphics primitive index and is not available if a new index has been loaded into a cache and has not been processed by the arithmetic calculation block 34. If it is determined by the arithmetic calculation block 34 that the index in a vertex cache decoder/request unit is not needed, because the graphics primitive has been rejected or rendered, then an indication is sent from the arithmetic calculation block 34 to the thread flag register 20 to adjust the flags accordingly.

FIG. 1B shows a diagram of the data structures in FIG. 1A for a triangle as a graphics primitive. A vertex cache decoder/request unit 50 is depicted in which three sets 52*a–c* of six bits are stored. Each set 52*a–c* of six bits forms an index into the vertex cache 54. In the memory, at a base address formed from the index the coordinates of the vertex are stored. At the base address +1, attribute information ARGB is stored and at base address +2, additional attribute information UVRQ is stored. In other embodiments, each vertex could have more than two items of attribute information. The parameter n indicates how much attribute information is stored for a vertex.

FIG. 1B also shows the steps involved in accessing a single triangle in one thread and two triangles in two threads. For the single triangle case, in cycle 1, the coordinates for each vertex of the triangle are fetched. In cycle 2, the first set of attribute data for each vertex is fetched and in cycle 3, the second set of attribute data is fetched. For the two triangle case, in cycle 1, the coordinates for each vertex of the triangle are fetched. In cycle 2, the coordinates of each vertex of the second triangle are fetched. In cycles 3 and 4 the attribute data for each vertex of the first triangle is fetched, assuming it is not rejected and in cycles 5 and 6, the attribute data for each vertex of the second triangle is fetched, assuming it is not rejected. Note that the HEAD information is processed first for each primitive. If the primitive is not rejected, all of the attribute data is then obtained for the primitive.

The system 10 operates as follows. An index for a graphics primitive, such as a triangle, line, or point, is received by the round robin selector 12. Based on the thread flag register 20, the round robin selector 12, chooses one of the available vertex cache decoder/request units 14*a–f*. The selection rule observed by the round robin selector is to choose the next available vertex cache decoder/request units in circular order.

In response to the activation of one of the load signals load0–load5, the index of the graphics primitive is loaded into the selected vertex cache decoder/request unit. At the same time, the round robin selector forms the thread id ID(2:0) for the selected vertex cache decoder/request unit, and loads the thread id into both the HEAD ID FIFO and DATA ID FIFO. The included decoder and request logic next issues a HEAD request hrq. Only a HEAD request hrq from one of the vertex cache decoder/request units is granted. When the head request is granted, the vertex cache decoder/request unit issues one or more DATA requests (a request with mode>0). The number of DATA requests is equal to the number of attributes associated with each vertex in the primitive, unless a rejection from the Arithmetic Calculation block stops the data request. The HEAD MUX 22 receiving the head requests, selects the proper vertex cache decoder/request unit for the HEAD pointer due to the selection information from the HEAD ID FIFO 16. The DATA MUX 24 receiving the data requests selects the proper vertex cache decoder/request unit for a DATA pointer due to the selection information from the DATA ID FIFO 16. The DATA MUX 24 receiving the data requests selects the proper vertex cache decoder/request unit for a DATA pointer due to the selection information from the DATA ID FIFO 18. Each MUX passes its respective pointer off to the final multiplexer 26 which is configured to select a HEAD pointer (mode =0) if it is present rather than DATA pointer (mode >0), because any hrq 28 is the selection input for the final multiplexer 26. Thus, HEAD pointer is prioritized over the DATA pointer.

When the HEAD/DATA Fetching Control block 30 receives the selected pointer from the final multiplexer 26, it decodes the selected pointer and generates the addresses needed to fetch HEAD or DATA information. The pointer acts as an offset address into the vertex cache 32. Specifically, the address is OFFSET ADDRESS (INDEX <<n) + mode, where n is programmable to give the vertex stride in the vertex cache 32, where vertex stride is defined as the number of entries per vertex. For a triangle primitive to be accessed from the vertex cache 32, one access is required OFFSET ADDRESS (INDEX <<n) + mode, where mode equals 0, to access the coordinates of the vertices of the triangle. Two more accesses are required (OFFSET ADDRESS (INDEX <<n) + mode, where mode equals 1 and OFFSET ADDRESS (INDEX<<n) + mode, where mode equals 2) to access the attribute data for the three vertices. The first access obtains $A_0R_0G_0B_0$, and $A_1R_1G_1B_1$ and $A_2R_2G_2G_2$ for vertices 0, 1 and 2, respectively of the triangle. The second access obtains $U_0V_0R_0Q_0$, $U_1V_1R_1Q_1$ and $U_2V_2R_2Q_2$ for vertices 0, 1, and 2, respectively of the triangle. The fetched HEAD or DATA parameters are passed to the Arithmetic Calculation block 34, which among other operations, determines whether the thread should be rejected. If so, the thread flag register is informed and changes one of its flags to indicate that a vertex cache decoder/request unit is available to receive new data.

Figure 2A:
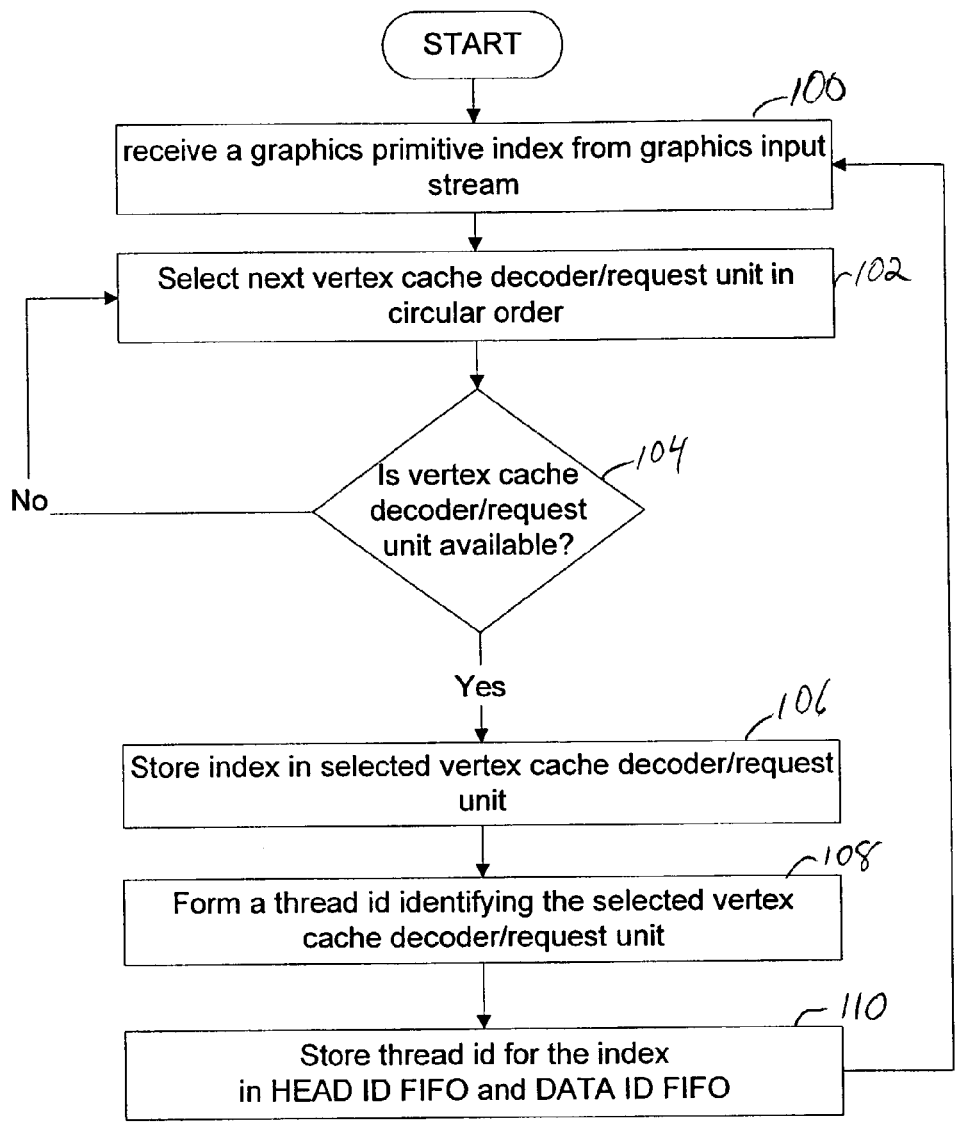
FIGS. 2A–C show a flow chart of a process in accordance with one embodiment of the present invention.

Referring to FIG. 2A, first graphics primitive index is received in step 100 according to the graphics data stream. The next vertex cache decoder/request unit in circular order is selected in step 102. The thread flag register is tested, in step 104, to determine whether the selected vertex cache decoder/request unit is available to accept the index. If the selected vertex cache decoder/request unit is not available, the next vertex cache decoder/request unit in circular order is selected, in step 102, and the test, in step 104, is repeated. If the selected vertex cache decoder/request unit is available, as determined in step 104, the received index information is stored, in step 106, in the selected cache. The thread id of the selected cache is then formed and assigned to the index item and stored, in step 108, in both the HEAD ID FIFO and DATA ID FIFO. Thus, the HEAD ID FIFO and DATA ID FIFO each contain entries whose order indicates the order of the graphics primitives in the graphics data stream. The loop in FIG. 2A repeats while there is still new indexes available and they can be stored in one of the caches.

Figure 2B:
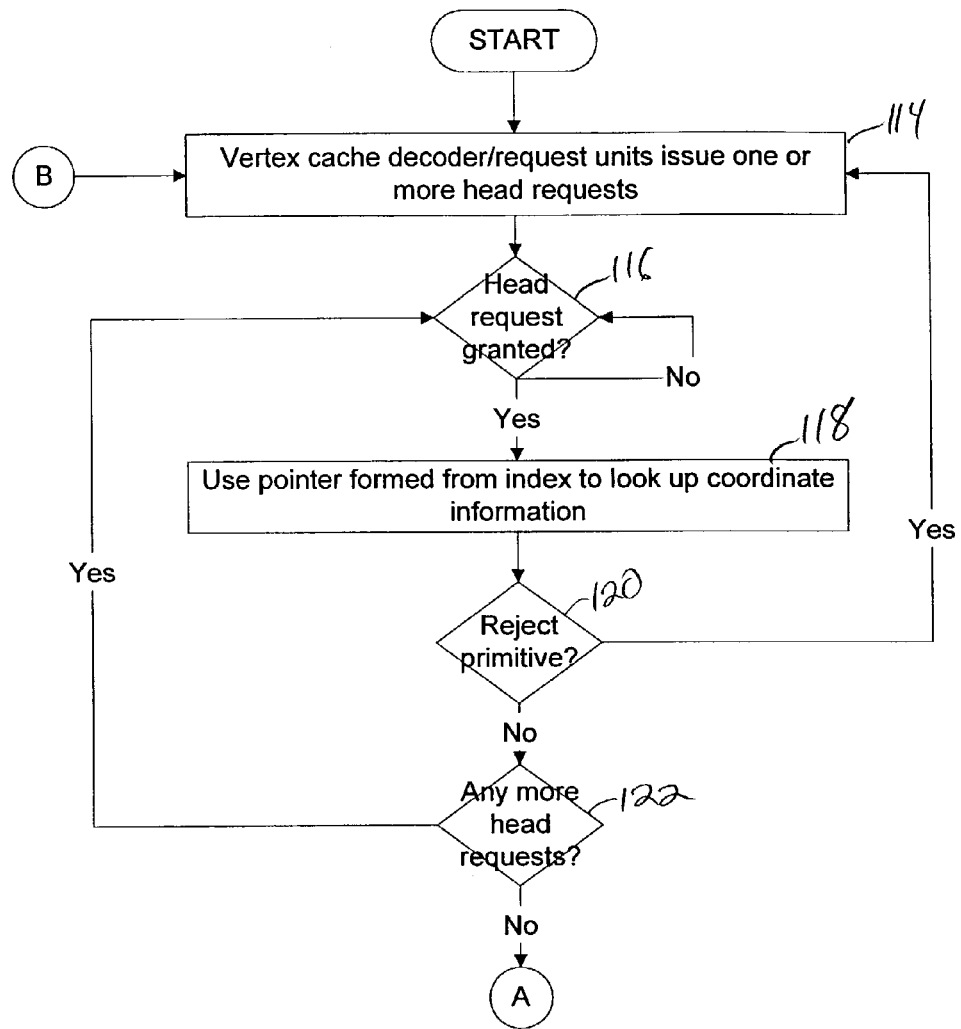

Referring to FIG. 2B, a flow chart is set forth that describes the operation of reading coordinate information for processing and to determine whether or not the attribute data for the graphics primitive should be processed. In step 114, one or more HEAD requests are issued. One of the HEAD requests is granted, in step 116, based on the contents of the HEAD ID FIFO. For the granted request, the HEAD pointer is used to look up, in step 118, coordinate information for each vertex of the primitive from the vertex cache 32. A test is made, in step 120, to determine whether the primitive should be rejected. If so, another HEAD request is sought in step 114. If there are any more head requests, as determined in step 122, based on the contents of the HEAD ID FIFO, and if a request is granted, as determined in step 116, another set of coordinate information for a primitive is looked up and tested for rejection. Thus, head information is given priority and processed before any attribute information is processed. Also, the need for the separate HEAD ID FIFO and DATA ID FIFO is clear, as the HEAD ID FIFO may advance several steps and get ahead of the DATA ID FIFO.

Referring to FIG. 2B, a flow chart is set forth that describes the operation of reading coordinate information for processing and to determine whether or not the attribute data for the graphics primitive should processed. In step 114, one or more HEAD requests are issued. One of the HEAD requests is granted, in step 116, based on the contents of the HEAD ID FIFO. For the granted request, the HEAD pointer is used to look up, in step 118, coordinate information for each vertex of the primitive from the vertex cache 32. A test is made, in step 120, to determine whether the primitive should be rejected. If so, another HEAD request is sought in step 114. If there are any more head requests, as determined in step 122, based on the contents of the HEAD ID FIFO, and if a request is granted, as determined in step 116, another set of coordinate information for a primitive is looked up and tested for rejection. Thus, head information is given priority and processed before any attribute information is processed. Also, the need for the separate HEAD ID FIFO and DATA ID FIFO is clear, as the HEAD ID FIFO may advance several steps and get ahead of the DATA ID FIFO.

Figure 2C:
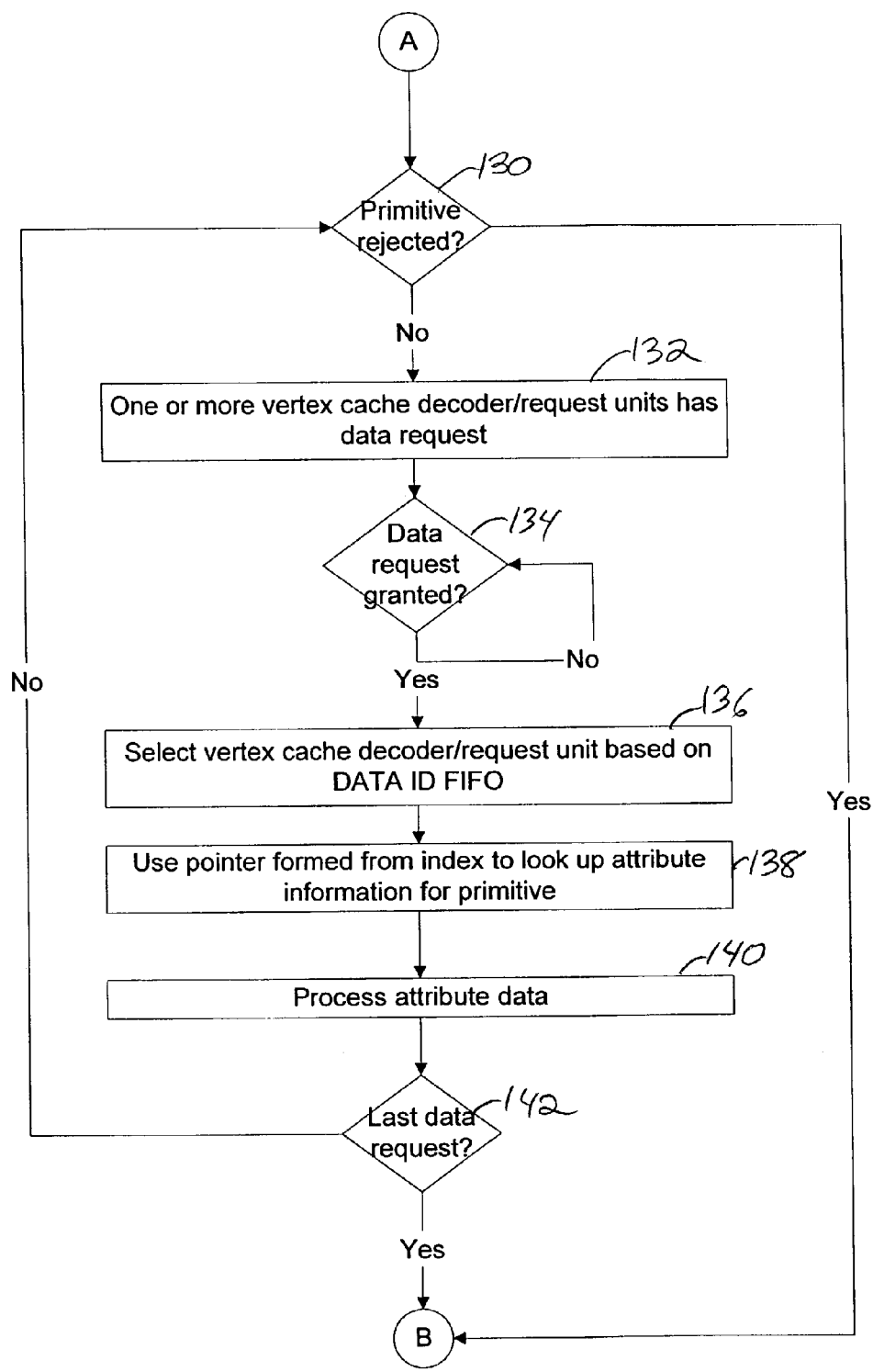

In FIG. 2C, a flow chart is set forth describing the process of reading and processing the attribute information. In step 130, if the primitive is not rejected, as determined in step 130, one or more vertex cache decoder/request units has a data request pending, in step 132. One of the data requests is granted, in step 134, and the vertex cache decoder/request unit is selected based on the contents of the DATA ID FIFO, in step 136. A pointer formed from the index is used to look up, in step 138, attribute information for the primitive, and in step 140, the attributes are processed. If there are more data requests, as determined in step 142, the process repeats at step 130. If the last data request has been processed, the process returns to step 114, looking for more head requests, if any. Note that the steps of entering indexes for new graphics primitives is independent of the steps of reading the indexes for the graphics primitives and processing the coordinate and attribute data.

Although the present invention has been described in considerable detail with reference to certain preferred versions thereof, other versions are possible. Therefore, the spirit and scope of the appended claims should not be limited to the description of the preferred versions contained herein.

What is claimed is:

1. A system for processing graphics data for a stream of graphics primitives, the system comprising:
   a plurality of memories, each having a unique thread id as an identifier of the memory, for storing an index of each graphics primitive in the stream;
   a plurality of decoders, each decoder coupled to one of the memories and each configured to generate a pointer pointing to HEAD parameters of the primitive and one or more pointers pointing to DATA parameters of the primitive based on the graphics primitive index stored in the memory to which the decoder is coupled;
   a HEAD ID FIFO for storing thread ids each indicating in which memory a corresponding index item is stored;
   a DATA ID FIFO for storing thread ids each indicating in which memory a corresponding index item is stored;
   a controller operative to receive the indexes ordered according to the stream of graphics primitives, the controller being further operative to select one of the plurality of memories for storing each received index and store the received index in the selected memory, assign a thread id to the received index, and store the assigned thread id in both the HEAD ID FIFO and the DATA ID FIFO;
   a HEAD multiplexer coupled to the plurality of memories and having a selection input that receives a stored thread id from the HEAD ID FIFO to select one of the plurality of decoders to output a pointer pointing to HEAD parameters of the primitive; and
   a DATA multiplexer coupled to the plurality of memories and having a selection input that receives a thread id from the DATA ID FIFO to select one of the plurality of decoders to output a pointer pointing to DATA parameters of the primitive.

2. A system for processing graphics data for a stream of graphics primitives as recited in claim 1,
   further comprising a thread flag register for indicating which ones of the plurality of memories is available to store data; and
   wherein the controller is operative to select an available one of the plurality of memories based on the thread flag register.

3. A system for processing graphics data for a stream of graphics primitives 1, further comprising a final multiplexer for selecting either the HEAD multiplexer or the DATA multiplexer for output, the output carrying either HEAD pointer or a DATA pointer.

4. A system for processing graphics data for a stream of graphics primitives as recited in claim 3,
   further comprising a vertex data storage device in which vertex data is accessed by an index;
   wherein the output HEAD pointer is used to select HEAD parameters for the graphics primitive from the vertex data storage device; and
   wherein the output DATA pointer is used to select DATA parameters for the graphics primitive from the vertex data storage device.

5. A system for processing graphics data for a stream of graphics primitives as recited in claim 4, wherein the HEAD parameters include position coordinates for a primitive.

6. A system for processing graphics data for a stream of graphics primitives as recited in claim 5, wherein the position coordinates are homogenous coordinates.

7. A system for processing graphics data for a stream of graphics primitives as recited in claim 4, wherein the DATA parameters include attribute data for the primitive.

8. A system for processing graphics data for a stream of graphics primitives as recited in claim 7, wherein the attribute data includes texture data and color data.

9. A method of processing graphics data for a stream of graphics primitives, the method comprising:
   receiving an index for a graphics primitive in the graphics stream, the graphics primitive having one or more vertices, each vertex having coordinate information and attribute information;
   selecting an available one of a plurality of memories to store the received index of the graphics primitive;
   forming a memory identifier to indicate the memory selected for storing the received index;
   storing the received index in the selected memory and the memory identifier for the index in a HEAD ID FIFO and a DATA ID FIFO;
   selecting one of the plurality of memories to output a HEAD pointer for the graphics primitive when indicated by a memory identifier in the HEAD ID FIFO, the HEAD pointer being formed based on the stored index and pointing to coordinate information for the vertices of the graphics primitive;

accessing coordinate information using the selected HEAD pointer; and displaying graphics on a display, which graphics have been generated by arithmetic calculations which utilize the accessed coordinate information.

10. A method of processing graphics data for a stream of graphics primitives as recited in claim 9, further comprising the step of determining, based on the coordinate information, whether or not the graphics primitive associated with the selected HEAD pointer is rejected.

11. A method of processing graphics data for a stream of graphics primitives as recited in claim 10, if the graphics primitive is rejected, updating a thread flag to indicate that the selected memory for the graphics primitive is available to accept a new graphics primitive.

12. A method of processing graphics data for a stream of graphics primitives as recited in claim 10, further comprising, if the graphics primitive is not rejected, selecting one of the plurality of memories to output a DATA pointer for the graphics primitive when indicated by a memory identifier in the DATA ID FIFO, the DATA pointer being formed based on the stored index and pointing to attribute information for the vertices of the graphics primitive;

accessing the attribute information using the selected DATA pointer; and processing the attribute information for the primitive.

13. A method of processing graphics data for a stream of graphics primitives as recited in claim 9, wherein the step of selecting an available one of a plurality of memories to store the received index includes determining whether the memory is available as indicated by a thread flag.

* * * * *